(12) United States Patent
Bauer et al.

(10) Patent No.: US 6,753,402 B1
(45) Date of Patent: Jun. 22, 2004

(54) POLYESTER-POLYETHER BLOCK COPOLYMERS

(75) Inventors: Stephan Bauer, Ostercappeln (DE); Georg Heinrich Grosch, Bad Dürkheim (DE); Gerlinde Tischer, Ruhland (DE); Kathrin Harre, Dresden (DE); Eva Baum, Schwarzheide (DE); Thomas Ostrowski, Castrop-Rauxel (DE); Reinhard Lorenz, Laer (DE); Regina Pretzsch, Schwarzheide (DE); Michael Pcolinski, Bloomfield, MI (US); Stefan Dinsch, Schipkau (DE); Inge Rotermund, Ortrand (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/110,297

(22) PCT Filed: Oct. 2, 2000

(86) PCT No.: PCT/EP00/09628

§ 371 (c)(1),
(2), (4) Date: Apr. 10, 2002

(87) PCT Pub. No.: WO01/27185

PCT Pub. Date: Apr. 19, 2001

(30) Foreign Application Priority Data

Oct. 12, 1999 (DE) ......................... 199 49 091

(51) Int. Cl.$^7$ ............... C08G 18/42; C08G 18/48; C07C 41/03; C07C 43/10; C07C 43/13

(52) U.S. Cl. ............ 528/76; 252/182.27; 252/182.28; 252/182.29; 528/80; 560/190; 560/198; 560/200; 568/580; 568/581; 568/591; 568/601; 568/620; 568/624; 568/625

(58) Field of Search ............... 252/182.27, 182.28, 252/182.29; 528/76, 80; 560/190, 198, 200; 568/580, 581, 591, 601, 620, 624, 625

(56) References Cited

U.S. PATENT DOCUMENTS

| 3,652,713 A |   | 3/1972 | Okazaki et al. ............. 524/140 |
| 3,849,515 A |   | 11/1974 | Muller ..................... 528/274 |
| 5,145,883 A | * | 9/1992 | Saito et al. ................ 521/172 |
| 5,750,580 A | * | 5/1998 | Mayer et al. ................ 521/51 |
| 5,767,323 A | * | 6/1998 | Televantos et al. ......... 568/613 |

FOREIGN PATENT DOCUMENTS

| CA | 2143972 |   | 9/1995 |
| CA | 2210796 |   | 1/1998 |
| CA | 2228651 |   | 9/1998 |
| EP | 671424 |   | 9/1995 |
| EP | 821019 |   | 1/1998 |
| EP | 862947 |   | 9/1998 |
| WO | 99/44739 | * | 9/1999 |

* cited by examiner

Primary Examiner—Rabon Sergent
(74) Attorney, Agent, or Firm—Fernando A. Borrego

(57) ABSTRACT

Polyester-polyether block copolymers can be prepared by catalytic addition of alkylene oxides onto H-functional initiator substances, using polyester alcohols as H-functional initiator substances and multimetal cyanide compounds as catalysts.

11 Claims, No Drawings

POLYESTER-POLYETHER BLOCK COPOLYMERS

The present invention relates to hydroxyl-containing polyether-polyester block copolymers, their preparation and their use, in particular for producing polyurethanes.

Polyurethanes are produced in large quantities. They are usually produced by reacting polyisocyanates with compounds containing at least two hydrogen atoms which are reactive toward isocyanate groups, in particular polyether alcohols and/or polyester alcohols. For various applications, it would be advantageous to build both ether groups and ester groups into the polyurethane. However, owing to the incompatibility of polyether alcohols and polyester alcohols with one another, it is not readily possible to use these two compounds together in polyurethane formulations. One possible way of remedying this disadvantage would be to use polyols which have both groups in the molecule. EP-A-671 424 describes a process for preparing polyols containing ether and ester groups by reacting polyether alcohols with polyfunctional carboxylic acids. However, this process has the disadvantages that the viscosity rises greatly even during the preparation and the products formed have a high viscosity and high molecular weight.

At present, the customary preparation of polyether alcohols by base-catalyzed or acid-catalyzed alkylene oxide addition can only be carried out using initiator substances which are stable toward the base used, generally potassium hydroxide or Lewis acids. Customary initiator substances are, for example, glycerol, sugar and glycol. Due to their ester bond which is unstable toward aqueous bases and acids, polyesterols cannot be used as initiator substances.

The base- or acid-catalyzed alkylene oxide addition onto polyester alcohols would lead to cleavage of the polyesterol chain and to saponification of the polyester polyol right back to its starting components, i.e. the desired block structure could not be obtained in the subsequent alkylene oxide addition. The polyester-polyether polyol cleavage products formed in this way are difficult to reproduce and do not have a defined block structure.

It is an object of the present invention to provide polyols which have both ether groups and ester groups in the molecule, can be prepared by simple methods and do not have the disadvantages of the reaction products of polyether alcohols with polyfunctional carboxylic acids.

We have found that this object is achieved by use of multimetal cyanide compounds, frequently referred to as DMC catalysts, for the polymerization of alkylene oxides using polyesterols as initiator substances. Cleavage of the ester groups in the polyesterols does not occur under these conditions.

The present invention accordingly provides polyester-polyether block copolymers which can be prepared by catalytic addition of alkylene oxides onto H-functional initiator substances, wherein polyester alcohols are used as H-functional initiator substances and multimetal cyanide compounds are used as catalysts. The products obtained in this way preferably contain hydroxyl groups.

The invention further provides a process for preparing polyester-polyether block copolymers and provides for their use for producing polyurethanes by reaction with polyisocyanates.

Surprisingly, the defined preparation of the polyester-polyether block copolymers of the present invention by addition of alkylene oxides onto polyester alcohols using multimetal cyanide catalysts occurs successfully without redissociation of the polyester alcohols and other secondary reactions. The polyester-polyether block copolymers of the present invention have a narrow molecular weight distribution and a low content of unsaturated constituents.

The polyester alcohols used as starting materials for preparing the polyester-polyether block copolymers can be prepared by methods customary for this purpose.

The polyester alcohols used as starting materials for the preparation of the polyester-polyether block copolymers of the present invention are usually prepared by polycondensation of at least bifunctional carboxylic acids with at least difunctional alcohols. The polyesterols can also be prepared by polycondensation or polyaddition reactions of aliphatic, cycloaliphatic, araliphatic and/or aromatic carboxylic acid derivatives with aliphatic, cycloaliphatic, araliphatic and/or aromatic alcohols.

As carboxylic acid derivatives, preference is given to using compounds having at least two carboxyl groups, e.g. maleic acid, fumaric acid, malonic acid, adipic acid, glutaric acid, succinic acid, pimelic acid, suberic acid, azelaic acid, sebacic acid, phthalic acid, isophthalic acid, terephthalic acid, trimellitic acid, trimesic acid and/or their anhydrides and/or their acid chlorides.

As alcohols, preference is given to using compounds containing at least two hydroxyl groups, e.g. butanediol, neopentyl glycol, pentanediol, hexanediol, trimethylolpropane, pentaerythritol, glycerol, ethylene glycol and its higher homologues such as diethylene glycol and triethylene glycol, propylene glycol and its higher homologues such as dipropylene glycol and tripropylene glycol.

It is likewise possible to react hydroxycarboxylic acids and/or their derivatives such as lactones with themselves and/or with the abovementioned carboxylic acid derivatives and/or alcohols. Examples which may be mentioned are glycolic acid, lactic acid, hydroxypropionic acid, hydroxybutyric acid and hydroxyvaleric acid.

Polyester alcohols which are particularly preferred as initiator substances are those based on adipic acid and/or phthalic anhydride and monoethylene glycol, diethylene glycol and/or triethylene glycol, monopropylene glycol and/or dipropylene glycol and/or tripropylene glycol.

Apart from the acids mentioned, it is likewise possible to use fatty acid derivatives, in particular dimeric fatty acid derivatives as are marketed, for example, by UNICHEMA under the name Pripol®, derivatives based on castor oil and polyhydroxy fatty acids such as, for example, polyhydroxy fatty acid PHF 110 from Harburger Fettchemie. Also suitable are $\alpha,\beta$-unsaturated carboxylic acids, in particular hydroxy-functionalized $\alpha,\beta$-unsaturated carboxylic acids.

Besides direct reaction, esterification or transesterification variants are also known.

If desired, monofunctional alcohols or carboxylic acids can also be used in small amounts in the synthesis.

Furthermore, the carboxylic acids and alcohols may, if desired, bear further functional groups such as alkyl, aryl, amino, sulfonate, thio, phosphonate or acrylate groups.

The reaction of alcohols with free carboxylic acids is preferred for the preparation of the polyesterols. The polycondensation reaction is usually carried out at from 140 to 250° under atmospheric pressure or subatmospheric pressure. If desired, the reactions are catalyzed, preferably using acids, Lewis acids and metal salts, in particular titanium- and/or tin-containing esterification catalysts, for example n-butyl titanate, tin(II) octoate or tin dilaurate. The water of reaction is preferably distilled off until the reaction mixture has an acid number of <10 mg KOH/g, particularly preferably <3 mg KOH/g and in particular <1 mg KOH/g. It is also possible in principle to use polyester alcohols having higher acid numbers, since the excess acid groups react with the alkylene oxides. In a further embodiment, the reaction can be carried out under inert gas such as nitrogen or argon in order to prevent product discoloration due to oxidation products. Depending on the use for which the polyester polyols are intended, they have a hydroxyl number of from 0.5 to 500 mg KOH/g, preferably from 10 to 400 mg KOH/g, and in particular from 30 to 300 mg KOH/g. Thus, the polyester polyols preferably have a number average molecular weight Mn of from 250 to 200,000.

A summary overview of the preparation of polyesterols and their use for producing polyurethanes, in particular polyurethane foams, is given, for example, in the Kunststoff-Handbuch, Volume VII, "Polyurethane" 3$^{rd}$ edition 1993, edited by Dr. G. Oertel (Carl-Hanser-Verlag, Munich).

If the polyesterol-polyether block copolymers of the present invention are to be used for producing flexible polyurethane foams, they are particularly preferably prepared using polyester alcohols which have a viscosity in the range from 1000 to 40,000 mPa*s at 25° C. In particular, use is made of polyesterols based on propylene glycol and/or ethylene glycol and/or their higher homologues.

The preparation of the polyester-polyether block copolymers of the present invention is carried out by addition of alkylene oxides onto the polyester alcohols using multimetal cyanide catalysts.

As alkylene oxides, it is possible to use, for example, ethylene oxide, 1,2-epoxypropane (propylene oxide), 1,2-methyl-1,2-ethoxypropane, 1,2-epoxybutane, 2,3-epoxybutane (butylene oxide), 3-methyl-1,2-epoxybutane, 1,2-epoxypentane, 3-methyl-1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, styrene oxide, 1,2-epoxycyclopentane, 1,2-epoxycyclohexane, (2,3-epoxypropyl)benzene, vinyloxirane, 3-phenoxy-1,2-epoxypropane, 2,3-epoxypropyl methyl ether, 2,3-epoxypropyl ethyl ether, 2,3-epoxypropyl isopropyl ether, 2,3-epoxyl-1-propanol[sic], 3,4-epoxybutyl stearate, 4,5-epoxypentyl acetate, 2,3-epoxylpropyl[sic]methacrylate, 2,3-epoxylpropyl[sic] acrylate, glycidyl butyrate, metyl[sic]glycidate, ethyl 2,3-epoxybutanoate, 4-(trimethylsilyl)butane 1,2-epoxide, 4-(triethylsilyl)butane 1,2-epoxide, 3-(perfluoromethyl)propene oxide, 3-(perfluoroethyl)propene oxide, 3-(perfluorobutyl)propene oxide, 4-(2,3-epoxypropyl) morpholine, 1-(oxiran-2-ylmethyl)pyrrolidin-2-one, and also any mixtures of these with one another.

Preference is given to using ethylene oxide, propylene oxide, butylene oxide and mixtures thereof.

Alkylene oxides can be added on individually in the form of blocks and, when using more than two different alkylene oxides, in any mixing ratio as mixed blocks. Furthermore, the alkylene oxide mixing ratio can be varied either discontinuously or continuously during the synthesis.

Multimetal cyanide catalysts used are usually ones of the formula (I),

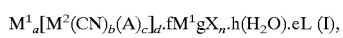

$M^1_a[M^2(CN)_b(A)_c]_d \cdot fM^1gX_n \cdot h(H_2O) \cdot eL$ (I), where $M^1$ is a metal ion selected from the group consisting of Zn2+, Fe2+, Co3+, Ni2+, Mn2+, Co2+, Sn2+, Pb2+, Mo4+, Mo6+, Al3+, V4+, V5+, Sr2+, W4+, W6+, Cr2+, Cr3+, Cd2+, $M^2$ is a metal ion selected from the group consisting of Fe2+, Fe3+, Co2+, Co3+, Mn2+, Mn3+, V4+, V5+, Cr2+, Cr3+, Rh3+, Ru2+, Ir3+, and M1 and M2 are identical or different, A is an anion selected from the group consisting of halide, hydroxide, sulfate, carbonate, cyanide, thiocyanate, isocyanate, cyanate, carboxylate, oxalate and nitrate, X is an anion selected from the group consisting of halide, hydroxide, sulfate, carbonate, cyanide, thiocyanate, isocyanate, cyanate, carboxylate, oxalate and nitrate, L is a water-miscible ligand selected from the group consisting of alcohols, aldehydes, ketones, ethers, polyethers, esters, ureas, amides, nitrites and sulfides, a, b, c, d, g and n are selected so that the compound is electrically neutral, and e is the coordination number of the ligand, f is a fraction or integer greater than or equal to 0, h is a fraction or integer greater than or equal to 0.

These compounds are prepared by generally known methods by combining the aqueous solution of a water-soluble metal salt with is the aqueous solution of a hexacyanometalate compound, in particular a salt or an acid, and adding a water-soluble ligand thereto during or after combination of the solutions.

To prepare the polyester-polyether block copolymers of the present invention, the polyester alcohols are firstly mixed with lip the catalyst and then the alkylene oxide or the mixture of alkylene oxides is metered into the polyester alcohol/catalyst mixture. In order to improve the miscibility of the alkylene oxide in relative highly viscous polyesters and thus to improve the alkoxylation, solvents such as toluene, xylene, tetrahydrofuran, acetone, 2-methylpentanone, cyclohexanone, N-methylpyrrolidone or dimethylformamide may, if appropriate, be added to the reaction mixture.

The reaction of the polyester alcohols with the alkylene oxides is preferably carried out at pressures in the range from 1 to 20 bar, in particular from 2 to 10 bar, and temperatures in the range from 60 to 150° C., in particular from 80 to 130° C. The preparation is also preferably carried out under a protective gas atmosphere, in particular under a nitrogen and/or argon atmosphere. After the addition of the alkylene oxide has been completed, it is usually followed by an after-reaction phase in order to achieve complete conversion of the alkylene oxides. The polyester-polyether block copolymers are then worked up. The polyester-polyether block copolymer preferably have a ratio of ether groups to ester groups in the range of from 0.01:1 to 100:1 and a number average molecular weight range of from 300 to 300,000.

Secondary constituents such as unreacted monomers and volatile compounds can be removed by various methods known to those skilled in the art, for example by distillation, work-up by means of a thin film evaporator or stripping with nitrogen and/or steam.

If appropriate, suspended materials and solids can be removed from the reaction mixture by various methods known to those skilled in the art, for example centrifugation or filtration.

For certain applications of the polyester-polyether copolymers of the present invention, the catalyst can also remain in the end product.

The polyester-polyether block copolymers are preferably used for producing polyurethanes, in particular rigid polyurethane foams, flexible polyurethane foams and thermoplastic polyurethanes. The polyurethanes are produced using methods known per se by reacting the polyols with polyisocyanates. Depending on the desired properties of the polyurethanes, it is possible to use the polyester-polyether block copolymers of the present invention either alone or together with other compounds containing at least two hydrogen atoms which are reactive toward isocyanate groups. Compounds containing at least two hydrogen atoms which are reactive toward isocyanate groups which can be reacted together with the polyester-polyether block copolymers in the reaction with polyisocyanates include polyether alcohols, polyester alcohols and, if desired, bifunctional or polyfunctional alcohols and amines having a molecular weight in the range from 62 to 1000 g/mol, i.e. chain extenders and crosslinkers. Furthermore, it is possible to use catalysts, blowing agents and the customary auxiliaries and/or additives.

Such compounds and processes for producing the polyurethanes are described, for example, in the Kunststoff-Handbuch, Volume VII, "Polyurethane" $3^{rd}$ edition 1993, edited by Dr. G. Oertel (Carl-Hanser-Verlag, Munich).

It has surprisingly been found that the polyester-polyether block copolymers of the present invention increase the compatibility of polyesterols with polyetherols. Mixtures of polyesterols and polyetherols usually separate into different phases, so that such mixtures can only very rarely be processed in industry. The demixing leads to inhomogeneities in the foam, for example streak formation and crack formation at the phase boundary. Such foams are unusable. Surprisingly, mixtures of polyester alcohols and polyether alcohols are stable to phase separation if at least one polyester-polyether block copolymer according to the present invention is additionally used as phase compatibilizer. Such mixtures are homogeneous and can be processed to form polyurethanes without problems. Particularly in the production of flexible polyurethane foams, the use of such mixtures gives very uniform and fine-celled foams.

Furthermore, foams produced using the polyester-polyether block copolymers of the present invention can generally be readily flame laminated.

In addition, the polyester-polyether block copolymers of the present invention can also be used outside polyurethane chemistry. Possible application areas are as crosslinker components in resins such as epoxy resins and polyester resins, as surfactants or as phase compatibilizers in polymer blends. The polyester-polyether block copolymers of the present invention can also be used as thermoplastic polymers. Here, polyester-polyether block copolymers which have no free functional groups in the molecule are preferably employed.

Moreover, the polyester-polyether block copolymers of the present invention can be functionalized by reaction with further compounds, for example by reaction with epichlorohydrin and α,β-unsaturated compounds such as acrylic acid and methacrylic acid.

The polyester-polyether block copolymers functionalized by α,β±unsaturated[sic] compounds can be crosslinked by various methods known to those skilled in the art.

EXAMPLES

Preparation of the Polyester-polyether Block Copolymers

Example 1

Preparation of Polyesterol A

In a stirred laboratory reactor, 216 g of monopropylene glycol (2.84 mol) were admixed with 377 g of adipic acid (2.58 mol) and heated to 130° C. until the reaction mixture was completely liquefied. While heating the reaction mixture further to 200° C., 93 ml of water of reaction were removed by distillation under atmospheric pressure. 10 ppm of n-butyl titanate were then added as catalyst. The reaction was stopped at an acid number of less than 2 mg KOH/g. The clear polyesterol A formed had the following properties:

| | |
|---|---|
| hydroxyl number = | 55.5 mg KOH/g |
| acid number = | 1.83 mg KOH/g |
| viscosity = | 1060 mPa · s at 75° C. |
| water content = | 0.039% |

Example 2

Preparation of Polyesterol B

In a stirred laboratory reactor, 798 g of diethylene glycol (7.53 mol) were admixed with 897 g of adipic acid (6.14 mol) and heated to 130° C. until the reaction mixture was completely liquefied. While heating the reaction mixture further to 200° C., 197 ml of water of reaction were removed by distillation under atmospheric pressure. 10 ppm of n-butyl titanate were then added as catalyst. The reaction was stopped at an acid number of less than 2 mg KOH/g. The clear polyesterol B formed had the following properties:

| | |
|---|---|
| hydroxyl number = | 227 mg KOH/g |
| acid number = | 0.35 mg KOH/g |
| viscosity = | 60 mPa · s at 75° C. |
| water content = | 0.024% |

Example 3

Preparation of the DMC Catalyst 479.3 g of an aqueous zinc acetate solution (13.38 g of zinc acetate dihydrate and 2.2 g of Pluronic® PE 6200 (BASF Aktiengesellschaft) dissolved in 150 g of water) were heated to 50° C. While stirring (screw stirrer, stirrer input: 1 W/l), an aqueous hexacyanocobaltic acid solution (cobalt content: 9 g/l, 1.5% by weight of Pluronic® PE 6200 based on the hexacyanocobaltic acid solution) was then metered in over a period of 20 minutes. After addition of the hexacyanocobaltic acid was complete, the mixture was stirred for another 5 minutes at 50° C. The temperature was subsequently reduced to 40° C. over a period of one hour.

The solid which precipitated was separated from the liquid by means of a pressure filter and was washed with water.

The moist filtercake was subsequently dispersed in sufficient water to give a 5% strength by weight multimetal cyanide suspension.

Example 4

Preparation of a Polyester-polyether Block Copolymer

In a 250 ml stirring autoclave, 2.0 g of the DMC catalyst as described in Example 3 were dispersed in 130 g of polyesterol A at 110° C. The suspension was then evacuated at 3 mbar for 2 hours. The reaction mixture was subsequently made inert by means of 10 bar nitrogen pressure. At an autoclave pressure of 0.5 bar of nitrogen and a temperature of 130° C., 70 g of propylene oxide were then added over a period of 5 minutes using a nitrogen admission pressure of 10 bar. After 2 hours, the reaction mixture was degassed at a reduced pressure of 5 mbar and a temperature of 100° C. and was subsequently worked up by filtration. The product obtained had the following properties:

| | |
|---|---|
| hydroxyl number = | 35.9 mg KOH/g |
| acid number = | 0.1 mg KOH/g |

-continued

| | |
|---|---|
| viscosity = | 750 mPa · s at 75° C. |
| M$_w$ = | 3100 g/mol |

Example 5
Preparation of a Polyester-polyether Block Copolymer

In a 250 ml stirring autoclave, 1.0 g of the DMC catalyst as described in Example 3 were dispersed in 130 g of polyesterol B at 110° C. The suspension was then evacuated at 3 mbar for 2 hours. The reaction mixture was subsequently made inert by means of 10 bar nitrogen pressure. 70 g of propylene oxide were then added at 130° C. After 3 hours, the reaction mixture was degassed at a reduced pressure of 4 mbar and a temperature of 90° C. The product obtained had the following properties:

| | |
|---|---|
| hydroxyl number = | 148.1 mg KOH/g |
| acid number = | 0.2 mg KOH/g |
| viscosity = | 40 mPa · s at 75° C. |
| M$_w$ = | 756 g/mol |

Example 6
Production of a Flexible Polyurethane Slabstock Foam 400 g of Lupranol® 2080, a polyetherol from BASF having a hydroxyl number of 48 mg KOH/g, and 400 g of Lupraphen® 8190, a polyesterol from BASF having a hydroxyl number of 61 mg KOH/g, and 200 g of the polyetherol as described in Example 4 were intimately mixed by means of a stirrer. The slightly turbid dispersion obtained displayed no phase separation even after more than 50 days.

1000 g of this polyol mixture were mixed with 38 g of water, 10 g of Tegostab® BF 2370 (silicone stabilizer from Goldschmidt AG), 0.12 g of Lupragen® N201, 0.4 g of Lupragene N206 (amine catalysts from BASF Aktiengesellschaft) and 2.0 g of Kosmos® 29 (tin catalyst from Goldschmidt AG) by means of a stirrer. 491.9 g of Lupranat® T80 A, a tolylene 2,4-/2,6-diisocyanate mixture from BASF Aktiengesellschaft, were then added while stirring and the reaction mixture was poured into an open box mold (400×400×400 mm) in which it foamed to produce the polyurethane foam. A fine-celled, homogeneous and open-celled flexible foam was obtained.

We claim:

1. A polyester-polyether block copolymer comprising the catalytic addition product of alkylene oxides onto H-functional initiator substances in the presence of a catalyst, wherein said H-functional initiator substances comprise polyester alcohols and said catalyst comprises multimetal cyanide compounds.

2. A polyester-polyether block copolymer as claimed in claim 1, wherein the polyester alcohols comprise the reaction product of polyfunctional alcohols with polyfunctional carboxylic acids.

3. A polyester-polyether block copolymer as claimed in claim 1, wherein the polyester alcohols have a number average molecular weight Mn in the range from 250 to 200,000.

4. A polyester-polyether block copolymer as claimed in claim 1, wherein the multimetal cyanide compounds have the formula (I)

$$M^1_a[M^2(CN)_b(A)_c]_d \cdot fM^1gX_n \cdot h(H_2O) \cdot eL \qquad (I),$$

where

M$^1$ is a metal ion selected from the group consisting of Zn2+, Fe2+, Co3+, Ni2+, Mn2+ Co2+, Sn2+, Pb2+, Mo4+, Mo6+, Al3+, V4+, V5+, Sr2+, W4+, W6+, Cr2+, Cr3+, Cd2+, M$^2$ is a metal ion selected from the group consisting of Fe2+, F33+, Co2+, Co3+, Mn2+, Mn3+, V4+, V5+, Cr2+, Cr3+, Rh3+, Ru2+, Ir3+, and M1 and M2 are identical or different, A is an anion selected from the group consisting of halide, hydroxide, sulfate, carbonate, cyanide, thiocyanate, isocyanate, cyanate, carboxylate, oxalate, and nitrate, X is an anion selected from the group consisting of halide, hydroxide, sulfate, carbonate, cyanide, thiocyanate, isocyanate, cyanate, carboxylate, oxalate and nitrate, L is a water-miscible ligand selected from the group consisting of alcohols, aldehydes, ketones, ethers, polyethers, esters, ureas, amides, nitriles and sulfides, a, b, c, d, g, and n are selected so that the compound is electrically neutral, and e is the coordination number of the ligand, f is a fraction or integer greater than or equal to 0, h is a fraction or integer greater than or equal to 0.

5. A polyester-polyether block copolymer as claimed in claim 1, wherein the alkylene oxides comprise ethylene oxide, propylene oxide, butylene oxide or any mixture thereof.

6. A polyester-polyether block copolymer as claimed in claim 1, wherein the ratio of ether groups to ester groups in the block copolymer is in the range of from 0.01:1 to 100:1.

7. A polyester-polyether block copolymer as claimed in claim 1, wherein the number average molecular weight Mn of the block copolymer is in the range of from 300 to 300,000.

8. A process for preparing polyester-polyether block copolymers, which comprises adding at least one alkylene oxide onto at least one polyester alcohol in the presence of a multimetal cyanide catalyst.

9. A process for producing polyurethanes by reacting polyisocyanates with compounds containing at least two hydrogen atoms which are reactive toward isocyanate groups, wherein said compounds comprise polyester-polyether block copolymers as claimed in any of claims 1 to 7.

10. A storage-stable polyol component for producing polyurethanes, comprising at least one polyether alcohol and at least one polyester alcohol and, as compatibilizer, at least one polyester-polyether block copolymer as claimed in any of claims 1–7.

11. A polyurethane produced according to the process as claimed in claim 9.

* * * * *